UNITED STATES PATENT OFFICE.

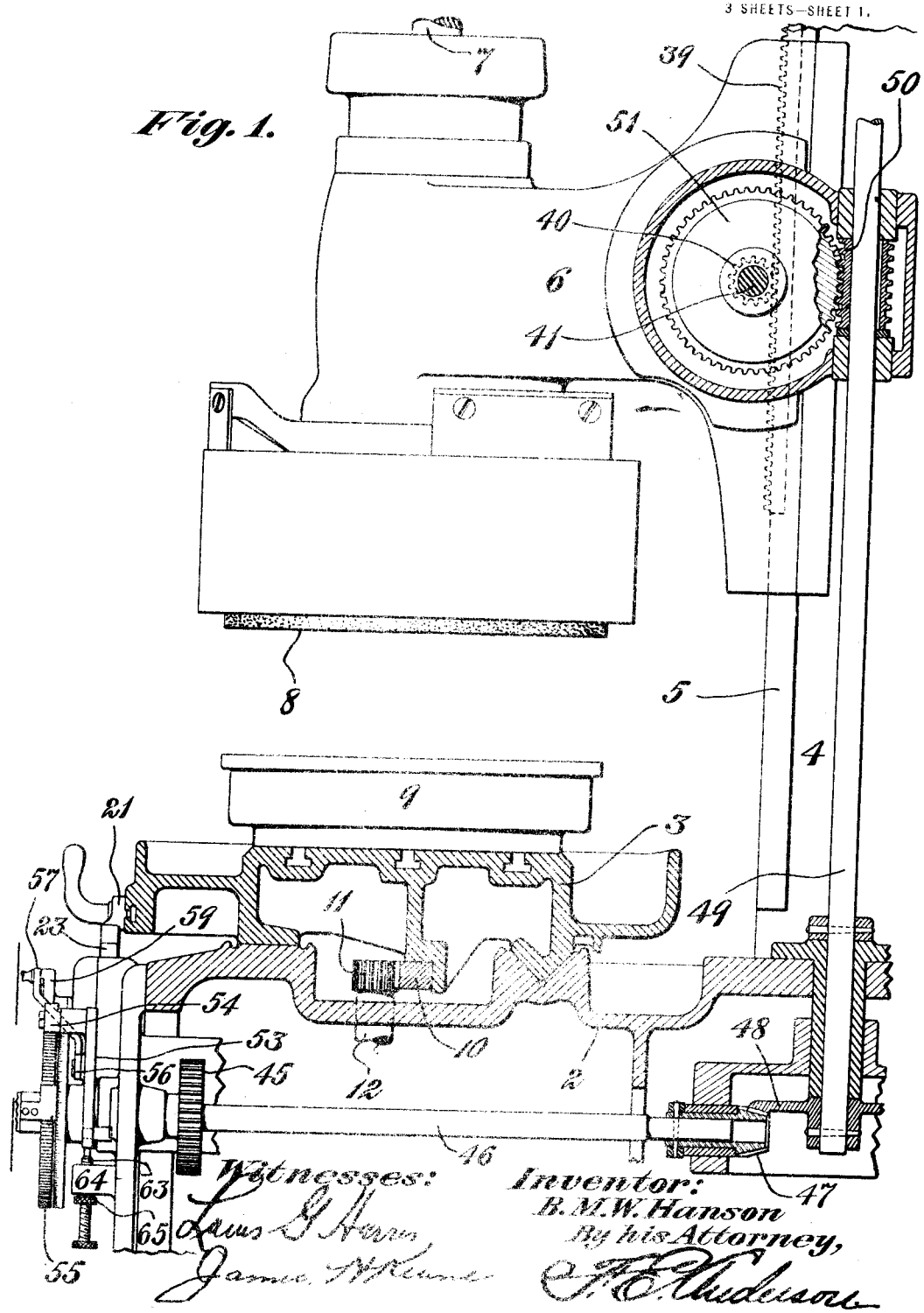

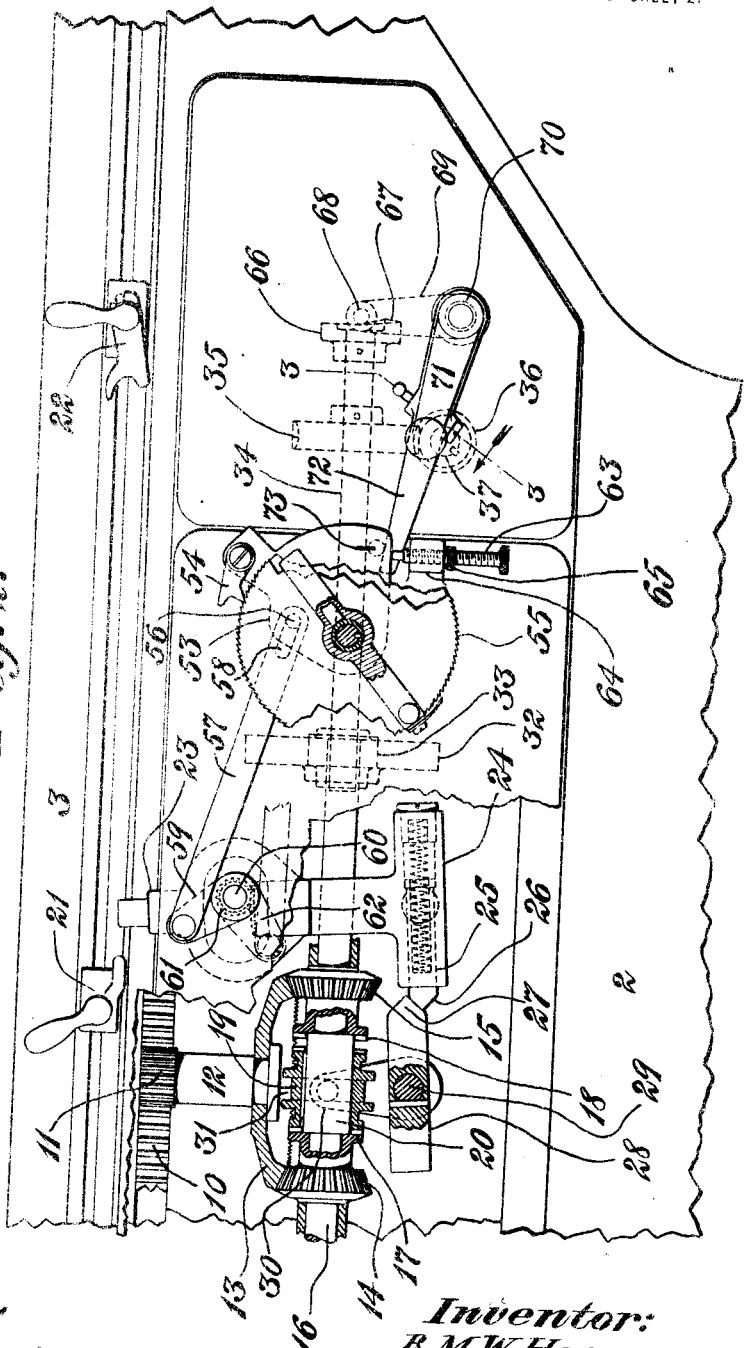
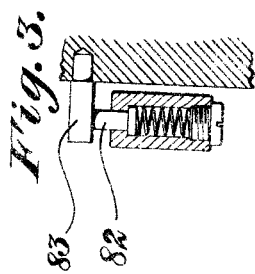

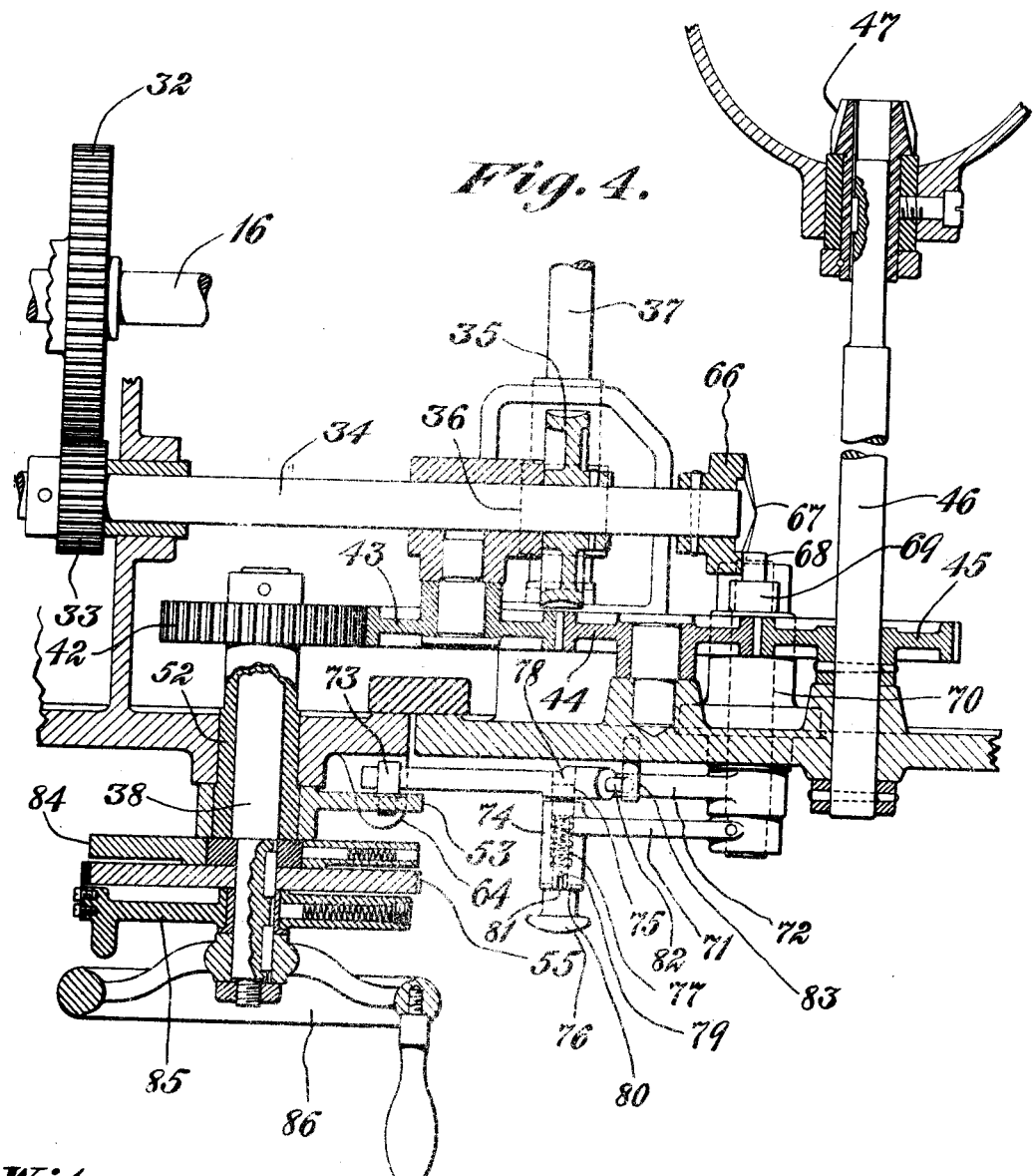

BENGT M. W. HANSON, OF HARTFORD, CONNECTICUT, ASSIGNOR TO PRATT & WHITNEY COMPANY, OF HARTFORD, CONNECTICUT, A CORPORATION OF NEW JERSEY.

FEED MECHANISM.

1,184,850.      Specification of Letters Patent.      Patented May 30, 1916.

Application filed July 10, 1914. Serial No. 850,253.

*To all whom it may concern:*

Be it known that I, BENGT M. W. HANSON, a citizen of the United States, residing at Hartford, in the county of Hartford and State of Connecticut, have invented certain new and useful Improvements in Feed Mechanism, of which the following is a specification.

This invention which relates to feed mechanism is especially adapted to that type of metal-working machine in which a work support or carriage and a tool for operating upon the work are mounted for movement with respect to each other upon a suitable frame, which usually comprises a bed and a column rising therefrom. The character of such relative movement between the work carriage and tool, varies according to the character of the work to be done. For instance, in one case the work carriage may be reciprocated to cause the work to travel a path intersected by a reducing tool. In another case, due to the extent of the work, it may not be necessary to reciprocate the work carriage. In both cases, however it is desirable to impart to the reducing tool an advance movement or feed. In the first case, this feed is advantageously derived from the moving work carriage and transferred through suitable mechanism to said reducing tool. When conditions require that the work carriage be held in a fixed relation, as in the second case mentioned, the mechanism associated with the work carriage for imparting feed movement to the reducing tool, will obviously, be rendered inoperative. For this reason it became necessary to devise other means to accomplish the required feed. Heretofore the tool-feed, under the conditions of this second case, has been manually effected, but this practice could not always be depended upon to give the uniform feed necessary to produce work of required accuracy.

What may be termed power operated auxiliary mechanism was found to fulfil the requirements in a very satisfactory manner and the object of my invention is the provision of such mechanism, simply and effectively constructed.

In the drawings accompanying and forming part of the present specification I have shown in detail one convenient form of embodiment of my invention, which to enable those skilled in the art to practise the same will be set forth fully in the following description. It is distinctly to be understood however, that I do not limit myself to this disclosure as I may depart therefrom in several respects within the scope of the invention defined by the claims following said description.

Referring to said drawings: Figure 1 is a transverse sectional view of a metal-working machine involving my invention, certain parts being shown in elevation. Fig. 2 is a front view of part of the bed of said machine showing a work carriage mounted thereon and certain elements of a feed-mechanism. Fig. 3 is a detail sectional view on line 3—3 of Fig. 2 looking in the direction of the arrow, and, Fig. 4 is a horizontal sectional view of feed-mechanism shown in Fig. 2.

Like characters designate similar parts throughout the several views, which, it will be observed, are drawn to different scales.

The machine illustrated in the drawings is commonly known as a grinding machine. Its bed or base is designated by 2 and supported thereby upon suitable ways, is the work carriage or table as 3. Rising from the bed 2 is a column as 4 on ways 5 of which is movably mounted the head 6 carrying the rotary tool spindle 7 coupled with the usual grinding-wheel or tool 8. Any suitable means (not shown) may be provided for driving said tool spindle at a proper speed.

As hereinbefore intimated, in performing a grinding operation on some work, for instance work of small extent such as could be held on a chuck as 9 (see Fig. 1) reciprocation of the table 3 may not be necessary. In this event simply a more or less gradual feed of the tool toward the work is all that is required. In other cases, however, as was also previously mentioned, the carriage or table 3 is reciprocated to pass the work successively back and forth beneath the action of the reducing tool 8, while the latter is advanced toward the work after completing each contact therewith or in other words at the end of each reciprocative stroke of the work carriage.

Mechanism for reciprocating the work carriage 3 will now be described. Fastened to the under side of said carriage 3 is a rack 10 meshing with a pinion 11 rigid with a stub shaft 12 suitably mounted in a bearing (not shown) in the framing of the machine.

At the end of the stub shaft 12 opposite the pinion 11 is rigidly mounted a bevel gear 13 meshing with pinions 14 and 15, loosely mounted on a shaft 16, but held against longitudinal movement with respect thereto. An extended hub of the pinion 14 is provided with clutch teeth 17, while a like hub on the pinion 15 is provided with clutch teeth 18. Between the clutch faces of the oppositely disposed pinions 14 and 15 is a clutch member 19, keyed to a sleeve 20 rigid with shaft 16. When said shaft 16 is rotated the clutch member 19 rotates therewith and if the latter be shifted to engage teeth 17 on pinion 14, or teeth 18 on pinion 15, the work carriage 3, through gear 13 shaft 12 and rack 11 will be driven in one direction or the other as the case may be, the arrangement of gearing shown being a common form of reversing mechanism.

Adjustably mounted on the carriage 3 are the dogs 21 and 22, adapted to alternately engage the rocker 23, and intermittently swing it back and forth. In the head 24 of said rocker 23, is the spring backed plunger 25, pointed as at 26 to engage the similarly pointed end 27, of an arm 28 rigid with a rock-shaft 29. Also rigid with rock-shaft 29 is an arm 30, which engages a groove 31, in the clutch member 19. As the rocker 23 is swung to the left (as seen in Fig. 2.) the point of plunger 25 will be carried below the point of arm 27 and as said rocker is swung to the right the point of plunger 25 will be carried above the point of arm 27. It will be apparent then, that when the point of plunger 25 is below the point of arm 28, the thrust of the former will cause rock-shaft 29 to swing to the left and engage clutch 19 to the left, while when the point of said plunger 25 is above the point of arm 28 the thrust of said plunger will cause rock-shaft 29 to swing to the right and engage clutch 19 to the right. It will be noted that power to move the point of plunger 25 from one side to the other of the point of arm 28 is derived from movement of the carriage, but to insure throwing of clutch 19 beyond a neutral position, power of the spring back of plunger 25 is depended upon.

Following the action of the parts just described it will be seen that as the dogs 21 and 22 alternately engage the rocker 23 and swing it to the right and to the left respectively, the carriage reversing mechanism will be correspondingly operated and the extent of movement of the carriage will depend upon the distance between said dogs 21 and 22, which as before stated are adjustably mounted.

The shaft 16, hereinbefore described in connection with the clutch 19, is driven through a gear 32 mounted thereon and meshing with a pinion 33 fast on the shaft 34. Pinned to the latter shaft is a worm-wheel 35, driven by the worm 36 fast on the shaft 37 which may be driven by a belt receiving pulley (not shown).

Referring now to the feed, one form of mechanism for advancing and retracting the tool or grinding-wheel as 8, includes as one of its elements a comparatively short shaft as 38, which is suitably mounted in the framing at the front of the machine. Associated with the column 4 and head 6 for raising and lowering the latter are the rack 39, and pinion 40, said rack being fastened to the column 4, and the pinion being rigid with a shaft 41 carried by the head 6 and extending transversely thereof. Power for driving the shaft 41 is transmitted from shaft 38 through gearing and shafts as follows:—gears 42, 43, 44, 45, shaft 46, bevel pinion 47, bevel gear 48, shaft 49, worm 50, and worm-wheel 51.

Loosely mounted on sleeve 52, surrounding the shaft 38, is a rocker 53, provided with a pawl 54 adapted to engage the teeth of a ratchet-wheel 55, said ratchet-wheel being keyed to the shaft 38. It will be apparent that when the rocker 53 is swung to the left (see Fig. 2) the ratchet-wheel 55, will, if the pawl 54 is in engagement therewith, be moved a corresponding amount, and this movement will be transmitted through shafts and reducing gearing described, to the head 6.

Near one side of the segmental flange comprising the rocker 53, is a pin or stud as 56. A link 57, slotted as at 58 to engage stud 56, is pivoted at its other end to an arm 59, rigidly fastened to a shaft 60 which also rigidly carries a pinion 61 meshing with a gear segment 62 fastened to the rocker 23. When the dog 21 moves rocker 23 to the right (Fig. 2) the arm 59 through the described parts will be swung to the position indicated by dotted lines, such action taking place as the carriage reaches the end of its travel to the right. In a similar manner, when the carriage reaches the end of its travel to the left, the dog 22 will swing rocker 23 to the left and cause arm 59 to assume the position in which it appears in full lines. Each time the arm 59 swings through the arc indicated, the link 57 is advanced and retracted; on the advance movement the rocker 53 is swung in a direction to cause the pawl 54 to advance the ratchet-wheel, while on the retractive movement, due to the lost motion provided for between pin 56 and slot 58 the rocker 53 will swing back by gravity to its normal position. This normal position of the rocker 53 is governed by the stop screw 63, which is tapped into the lug 64 on the machine frame and provided with a jam nut 65. As shown in Fig. 2, said stop screw 63 is positioned to permit of a full capacity stroke being given the pawl-rocker 53. By varying the length of stroke of said rocker by means of stop screw 63, the pawl may be made to advance the ratchet-wheel any desired number of teeth within its maximum limit of throw.

It will be clearly apparent that a reciprocatory movement of the carriage is essential to effect feeding of the ratchet-wheel 55 through the agency of the mechanism thus far described. Attention, however, has already been directed to the fact that for certain work the carriage is not reciprocated, and under such conditions it is necessary in providing for an automatic feed of the grinding-wheel to employ auxiliary mechanism. It was found to be practical and advantageous to interpose mechanism of this character between the shaft 34 and and pawl-rocker 53 and the construction involved in so doing will now be described, attention being first, again directed to the fact that when it is desired to eliminate the reciprocatory motion of the carriage the clutch member 19 is shifted to and maintained in neutral position. This does not necessitate stopping the rotation of shaft 18 or shaft 34, and from the latter is derived the power to effect the feed of the grinding-wheel when the carriage is stationary.

Fastened to the end of shaft 34, is a cam 66, the active face of which may have one or more rises as 67. Coöperative with the face of cam 66, is a stud 68 extending from a lever 69, which is pinned to a comparatively short shaft 70. To the other end of shaft 70, is pinned an arm 71 and adjacent to said arm 71, but loosely mounted on shaft 70, is an arm 72, the free end of the latter being adapted to engage a pin 73 on the pawl-carrier 53. In the head 74 at the end of arm 71, is mounted a spring-backed pin or locking-bolt 75, to the stem of which is fastened a manipulating knob 76. As shown in Fig. 4, said knob is turned to a position which permits the spring 77 to force the pin 75 inwardly or into locking relation with the arm 72, the latter being provided with a hole 78 to receive said pin. When by means of the knob 76, the pin 75 is withdrawn from the position in which it is shown and given a quarter turn, the small pin 79, extending transversely of the locking bolt 75, will rest in the groove 80 and hold said locking-bolt in unlocked relation. To accommodate the pin 79 when the locking-bolt 75 is in locking relation, the groove 81 is provided. This locked relation between levers or arms 71 and 72 constitute in effect a rigid connection between arm 72 and shaft 70.

About midway of its length the lever 72 is provided with a spring-backed pin 82, which bears with a yielding resistance against a projection or pin 83 extending from the machine frame. The thrust of the spring-backed pin 82 exerts a constant tendency to rotate the lever 72, and insures a firm contact of the stud 68 with the face of cam 66, when lever 72 is rigid, or in locked relation, with shaft 70. Also when an unlocked relation exists between shaft 70 and lever 72, possible rocking of the latter will be prevented by the thrust mentioned.

The simple action of the auxiliary feed mechanism just described is as follows:— The cam 66 rocks the arm 69, and this rocking motion is transmitted through shaft 70 and arm 72 to the pawl-carrier 53, so that the latter may be given the identical movement that it receives through the mechanism operated by the reciprocatory movement of the work-carriage. Either mechanism for effecting the rocking movement of the pawl-carrier may operate without disconnecting or affecting in any way the other. In other words, when link 57 rocks the pawl-carrier, pin 73 is simply moved away from lever or arm 72, and when lever 72 rocks the pawl-carrier, the stud 56 moves freely in the slot 58.

On one side of the ratchet-wheel 55 is the graduated disk 84 and on the other side is a knock-off-shoe-carrying member 85. Both of these elements are usual adjuncts of a feed mechanism, but form no part of my present invention and therefore will not be described in detail.

As it is frequently desirable to operate the feed mechanism by hand, there is provided for this purpose a hand-wheel 86, keyed to the extreme end of the shaft 38.

What I claim is:—

1. The combination of feed mechanism, ratchet mechanism including a pawl-carrier associated therewith, and separate devices adapted to operate independently to actuate said pawl-carrier, either of said devices being operable while the other is also in operable relation.

2. The combination of feed mechanism, ratchet mechanism including a pawl-carrier associated therewith, separate devices for actuating the pawl-carrier, and separate means associated with each of the devices whereby either may be made operative when the other is inoperative.

3. The combination of feed mechanism, ratchet mechanism including a pawl-carrier associated therewith, separate devices adapted to operate independently to actuate said pawl-carrier, and a controlling element means whereby any desired degree of movement of the pawl-carrier may be obtained from either of said devices.

4. The combination of feed mechanism, ratchet mechanism including a pawl-carrier associated therewith, pins on the pawl-carrier, a shiftable slotted link in engagement with one of the pins, and an oscillatory arm in engagement with the other pin, the relation between the slotted link and oscillatory arm and their respective pins being such that either may operate to actuate the pawl-carrier irrespective of the other.

5. The combination of feed mechanism, ratchet mechanism including a pawl-carrier associated therewith, a plurality of devices for actuating the pawl-carrier, and separate means interposed between each of the devices and the pawl-carrier for actuating the latter.

6. The combination of feed mechanism, ratchet mechanism including a pawl-carrier associated therewith, and separate co-existing devices independently operable, whereby either may actuate said pawl-carrier irrespective of the other.

7. The combination of feed mechanism, ratchet mechanism including a pawl-carrier associated therewith, and separate devices simultaneously engaging said pawl-carrier and adapted for independently actuating the latter.

8. The combination of feed mechanism, ratchet mechanism including a pawl-carrier associated therewith, separate devices simultaneously engaging said pawl-carrier and adapted for independently actuating the latter, and a controlling element whereby different degrees of movement of the pawl-carrier may be obtained from either of said devices.

9. In a grinding machine in combination, a work support, a reducing tool, means for feeding the reducing tool, and separate devices simultaneously associated with the feeding means for independently actuating the latter.

10. In a grinding machine in combination, a work support, a reducing tool, means for feeding the reducing tool, separated devices simultaneously associated with the feeding means for independently actuating the latter, and a controlling element whereby different degrees of movement of the feeding means may be obtained from either of said devices.

11. In a grinding machine in combination, a driving shaft, a movable work support, a reducing tool, means for feeding the reducing tool, and separate devices simultaneously associated with the feeding means and interposed respectively between the feeding means and the work support and the feeding means and the driving shaft for independently actuating said feeding means.

12. The combination of a carriage, a tool to operate on the work supported by the carriage, mechanism for feeding the tool, a driving shaft, and independent devices for operating the mechanism to feed the tool simultaneously interposed between said driving shaft and the feed mechanism.

13. The combination of a carriage, a tool to operate on the work supported by the carriage, mechanism for feeding the tool, a driving shaft, mechanism including the carriage interposed between said driving shaft and the tool feeding mechanism for operating the latter, a clutch for connecting the mechanism including the carriage with the driving shaft, and independent mechanism simultaneously interposed between the driving shaft and the tool feeding mechanism to operate the latter when said clutch is disconnected.

14. The combination of feed mechanism, ratchet mechanism including a pawl-carrier associated therewith, a driving shaft, a cam on said driving shaft, and means operated by said cam for actuating the pawl-carrier.

15. The combination of feed mechanism, ratchet mechanism including a pawl-carrier associated therewith, a driving shaft, a cam on said driving shaft, means operated by said cam for actuating the pawl-carrier, and means for varying the amount of movement of the pawl-carrier.

16. The combination of feed mechanism, ratchet mechanism including a pawl-carrier associated therewith, a driving shaft, a cam on said driving shaft, a rock-shaft, an arm rigid with the rock-shaft and operable by said cam, a second arm on said rock-shaft adapted to actuate the pawl-carrier, and means for maintaining proper relation between the first mentioned arm and the cam.

17. The combination of feed mechanism, ratchet mechanism including a pawl-carrier associated therewith, a driving shaft, a cam on said driving shaft, a rock-shaft, an arm rigid with the rock-shaft and operable by said cam, a second arm loose on said rock-shaft, and means for rigidly connecting said second arm with the rock-shaft, said second arm when thus connected being adapted to actuate the pawl-carrier.

In testimony whereof I affix my signature in presence of two witnesses.

BENGT M. W. HANSON

Witnesses:
LEWIS G. HARRIS,
F. E. ANDERSON.